Figure 1:
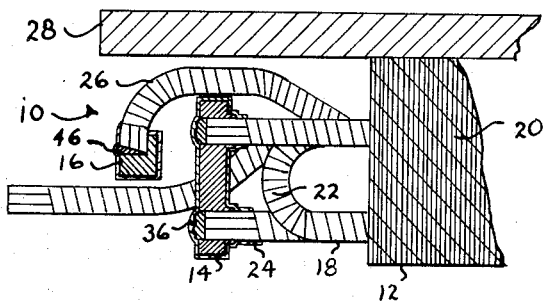

United States Patent
Beddows et al.

[15] 3,675,058
[45] July 4, 1972

[54] DYNAMOELECTRIC MACHINE UTILIZING PRE-FORMED WINDING CONNECTORS AND METHOD OF MAKING

[72] Inventors: Norman A. Beddows; John A. Quigley, both of Scotia; Warren P. Wielt, Schenectady, all of N.Y.

[73] Assignee: General Electric Company

[22] Filed: Sept. 8, 1970

[21] Appl. No.: 70,165

[52] U.S. Cl. ................................310/71, 174/84, 310/201
[51] Int. Cl. .........................................................H02k 11/00
[58] Field of Search....................310/179, 71, 270, 271, 260, 310/273, 272, 201; 339/18 C, 19, 222; 29/470.5, 484; 174/74, 75, 84, 93, 94

[56] References Cited

UNITED STATES PATENTS

| | | | |
|---|---|---|---|
| R24,074 | 10/1955 | Buchanan | 174/74 A |
| 1,171,591 | 2/1916 | Chubb | 174/84 |
| 1,403,185 | 1/1922 | Mix | 310/71 X |
| 2,407,935 | 9/1946 | Perfetti et al. | 310/201 |
| 3,192,423 | 6/1965 | Pearson | 174/94 X |
| 3,243,501 | 3/1966 | Patrick et al. | 174/94 X |
| 3,461,221 | 8/1969 | Herb | 174/84 |
| 3,426,227 | 2/1969 | Miller et al. | 310/50 X |
| 3,020,333 | 2/1962 | Bangert et al. | 29/470.5 X |
| 2,403,642 | 7/1946 | Draxler | 310/71 |
| 3,112,564 | 12/1963 | Murray | 29/470.5 |

FOREIGN PATENTS OR APPLICATIONS

| | | | |
|---|---|---|---|
| 508,875 | 7/1939 | Great Britain | 310/201 |

*Primary Examiner*—Lewis H. Myers
*Assistant Examiner*—U. Weldon
*Attorney*—John J. Kissane, James C. Davis, Jr., Frank L. Neuhauser, Oscar B. Waddell and Joseph B. Forman

[57] ABSTRACT

Series connections of rectangular aluminum multi-strand coil leads of a dynamoelectric machine can be readily made in a confined space by the utilization of prefabricated aluminum connectors having apertures therein to snugly receive the uninsulated extremities of the coil leads being joined. In making the weld, the individual strands forming the coil leads initially are joined e.g., utilizing MIG-welding or other conventional joining techniques, whereafter the joined strands are welded to the connector side wall and the weld is finished with a concave aluminum button to maximize the reliability of the joint. A suitable electrical insulation then is applied over both the connector and the uninsulated extremities of the coil leads and the joined leads are mechanically secured to the motor end turns to reduce stress upon the joint during motor operation. Prefabricated connectors also are disclosed for joining the phase and/or series leads to the arcuately shaped ring conductor without canting the natural curvature of the conductors forming the connection.

4 Claims, 3 Drawing Figures

PATENTED JUL 4 1972

3,675,058

INVENTORS
NORMAN A. BEDDOWS
JOHN A. QUIGLEY
WARREN P. WIELT

BY *[signature]*

THEIR ATTORNEY

DYNAMOELECTRIC MACHINE UTILIZING PRE-FORMED WINDING CONNECTORS AND METHOD OF MAKING

This invention relates to an improved method of forming series and/or phase connections within a dynamoelectric machine and to machines thus formed. In a more particular aspect, this invention relates to the use of prefabricated aluminum connectors to permit electrical joining of multi-strand rectangular aluminum coil leads within confined areas of a dynamoelectric machine.

In the fabrication of dynamoelectric machines, it is often necessary to form series and phase connections for a multitude of prewound coils to produce the desired machine winding. While these connections can easily be brazed when the conductors forming the coils are copper, in many motor applications aluminum conductors are desirable to minimize salt accumulation, or dendritic growth, and conductor corrosion. For example, motors employed for circulating reactant gases at high pressure during ammonia synthesis typically operate in an environment which may contain as much as 13 percent liquid ammonia at a temperature of approximately 100° F and a pressure of about 5,000 lbs./sq. in. Motors for such applications must be wound with aluminum coils to achieve any appreciable motor life expectancy during sustained recirculation of ammonial gases. Series connections of aluminum coil leads, however, are inhibited not only by the difficulties inherent in joining aluminum conductors but also by the confined space wherein the joint must be made. Moreover, because the motor coils often employ fluorocarbon polymeric insulating coating to inhibit corrosion of the underlying coils, prolonged heating of the coil leads during formation of the joint can tend to decompose the polymer releasing toxic gases and degrade the insulation in the affected area beyond use.

Among the techniques heretofore proposed to form the series and phase connections of aluminum coils for ammonia synthesis motors is to shape the leads to be joined into a confronting attitude whereafter the leads are M.I.G. welded (i.e., welded utilizing a consumable electrode in an inert atmosphere) employing a reusable copper mold disposed below the joint both to retain the liquid aluminum produced during welding and to form a heat sink tending to inhibit decomposition of the coil insulator. After welding, the copper mold is removed and the joint is suitably insulated, e.g., utilizing techniques disclosed in N.A. Beddows U.S. patent, Ser. No. 3,488,537, assigned to the assignee to the present invention. Although welding of multi-strand aluminum coil leads utilizing a removable mold produces a highly reliable connection, extensive set-up time is necessary to properly shape the aluminum conductors into a confronting attitude within the reusable mold and the space required for manipulating the mold necessarily produces a bulky connection. Moreover, because the insulation must be stripped from the coil leads over a considerable span, e.g., approximately 6 inches, to assure proper positioning of the shaped leads within the mold while providing an adequate span between the insulator and the mold, considerable time is required to re-insulate the welded connection.

It also has been suggested that the series and phase leads be brazed employing a fluoride flux and an aluminum alloy filler between the overlapped strands of the leads being joined. The joint formed by brazing, however, often is skewed inhibiting subsequent electrical insulation of the joint. The corrosive nature of the fluoride flux also requires water washing of residual flux from the joint tending to contaminate adjacent motor components and inhibit the formation of a dense insulation structure.

It is therefore an object of this invention to provide a novel method of rapidly forming reliable motor winding connections within a confined area.

It is also an object of this invention to provide a method of forming motor winding connections wherein the leads being joined do not require substantial shaping from the normal curvature of the leads.

It is a further object of this invention to provide a method of forming motor winding connections wherein minimal stripping of the lead insulation is required prior to joining.

It is a still further object of this invention to provide a dynamoelectric machine wherein reliable motor winding connections are produced within a confined area.

These and other objects of this invention generally are achieved by the utilization of a prefabricated connector having diverse slots therein to snugly receive the uninsulated extremities of the rectangular leads being joined. The leads then are electrically and mechanically joined to the connector, e.g. by any conventional aluminum joining technique such as M.I.G. or T.I.G. welding or brazing, whereafter both the connector and uninsulated extremities of the leads are insulated prior to being secured into position within the machine. Thus, a dynamoelectric machine in accordance with this invention would include a plurality of coils each formed of at least one rectangular conductor wound in a pre-determined configuration and positioned within slots in stacked magnetic laminations at an attitude such that the coil leads protrude outwardly from one end of the magnetic laminations. Series and phase connections electrically joining the coil leads to form the machine winding are made utilizing prefabricated electrically conductive connectors having a plurality of diverse slots therein to respectively receive the extremities of pre-determined leads to be interconnected. Each of the lead extremities within the connector are welded to the connector sidewall and an insulating coating is provided atop both the connector and the uninsulated lead extremities prior to mechanically securing the connected leads within the motor.

Figure 2:
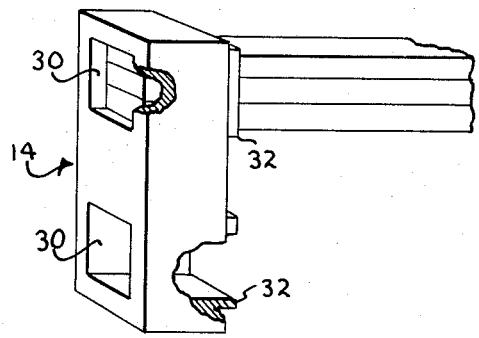
Figure 3:
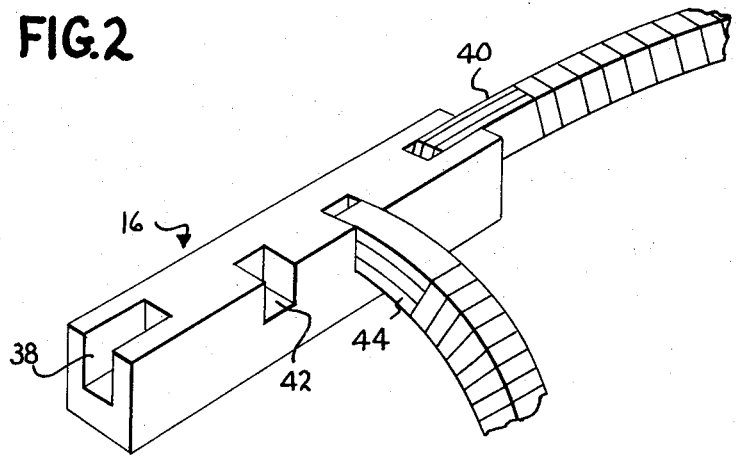

While the novel features of this invention are particularly pointed out and distinctly claimed in the appended claims, a more complete understanding of the basic principles of this invention may be obtained from the following detailed description taken in conjunction with the accompanying figures wherein:

FIG. 1 is a broken away sectional view illustrating diverse stator winding connections formed in accordance with this invention, FIG. 2 is a partially exposed isometric view of a prefabricated connector suitable for forming series connections of the stator coils and, FIG. 3 is an isometric view illustrating a prefabricated connector suitable for joining orthogonally disposed motor leads.

The end turn cavity 10 of a wye wound dynamoelectric machine stator 12 connected in accordance with this invention is illustrated in FIG. 1 and generally includes prefabricated aluminum connectors 14 and 16 for serially interconnecting the aluminum coil leads of the diverse coils forming the stator and for joining the aluminum phase conductors with the aluminum circuit ring conductors of the motor, respectively. Except for the use of prefabricated connectors to electrically join selective coil leads, stator 12 is otherwise conventional in design being formed by the disposition of pre-wound insulated coils 18 within aligned slots in stacked magnetic laminations 20 with only the coil end turns 22 and leads 24 protruding from the stacked laminations being illustrated in FIG. 1. Coil 18 typically is formed of a plurality (three in the illustrated Figure) of juxtaposed rectangular aluminum strands wound into a predetermined configuration and wrapped with a plurality of layers of fluorocarbon polymeric tapes 26 in accordance with the teachings of the heretofore cited Beddows U.S. patent, Ser. No. 3,488,537. In conventional fashion, a housing 28 serves to support the stacked stator laminations and extends as a shroud over the end turn cavity to shield the windings from injury. While motor 10 is described as a wye wound dynamoelectric machine because the novel features of the invention are particularly suited to such type machine windings, the prefabricated connectors of this invention can be utilized with any motor winding configuration, if desired.

Prefabricated connector 14 designed for serially interconnecting the aluminum coil leads within the motor is illustrated more clearly in FIG. 2 and generally comprises a rectangular, high melting point aluminum body having two vertically displaced parallel apertures 30 extending completely through the connector. Each of apertures 30 is rectangular in configuration and dimensioned relative to the rectangular strands forming coils 18 to snugly receive the coil leads within the apertures. In general, the lateral dimensions of apertures 30 should not exceed the lateral dimensions of the coil leads being inserted therein by more than 20 mils in either direction with a 5-8 mil oversize of the apertures relative to the rectangular conductors having been found optimum to snugly receive the coil leads without producing undue difficulty during insertion. If desired, insertion of the coil leads into the connector can be eased by rounding the edges of the leads and/or by the application of a suitable aluminum lubricant to the leads. Preferably the center to center span between rectangular apertures 30 is approximately equal to the span between the coil leads being connected to avoid undue shaping of the coil leads tending to spread the laminar strands and making difficult the insertion of the coil leads into the connectors.

To reduce the bulk of the connection, connector 14 desirably is made to be as small as possible while assuring a mechanically and electrically secure joint between the joined coil leads. To achieve this end, peripheral lips 32 protruding in the direction of the coil leads can be provided to strengthen the joint without unduly increasing the bulk of the connector or a portion of the intermediate portion of the connector situated between apertures 30 can be removed to reduce the weight of the connector. In general, 0.5 × 0.54 inch rectangularly shaped aluminum connectors having two 0.35 × 0.25 inch slots separated by a center piece of 1.34 inch have been found suitable for joining coil leads formed of three laminar 0.260 × 1.10 aluminum conductors. An insertion depth of approximately 0.45 inch is used to assure a deep reliable joint to the connector sidewall while providing a cavity to receive aluminum weldment maximizing the reliability of the connections (as will be more fully explained hereinafter).

To form the end turn connections of aluminum coils 18 in accordance with this invention, fluorocarbon polymeric tapes 24 are stripped from the ends of the coil leads to a distance of approximately 1.95 inch to provide a span of approximately 1½ inch from the connector to the polymeric adjacent tapes. Connector 14 then is juxtaposed with the stripped coil leads and the leads are inserted within apertures 30 to terminate slightly short of the connector face remote from the coil. Because the span between the apertures of the connector is approximately equal to the span between the coil leads being joined, the apertures lie substantially within the plane of the coil leads and relatively no shaping of the coil leads is required. The connector and insulating tape proximate the connector then are wrapped with wet asbestos to inhibit thermal degradation of the fluorocarbon polymeric tapes and joining is commenced by initially welding together the individual strands forming each coil lead, e.g., utilizing conventional M.I.G. welding techniques with a welding power of 150 amps and 12 volts ac, whereafter the joined strands are M.I.G. welded to the sidewalls of the connector in an identical fashion. By terminating the coil leads short of the connector face remote from the coil, a deeper weld within the connector is attained relative to welds effected when the coil leads completely fill the connector aperture. To avoid decomposition of the fluorocarbon polymeric tapes wound about the coil, the arc interval during welding preferably should not exceed approximately 30 seconds for a 0.26 × 1.1 aluminum conductor.

After welding the coil leads to the connector sidewall, aluminum weldmetel is deposited atop the coil lead end to form a concave button 36 further insuring the integrity of the joint. The joint then is filed smooth and insulated in accordance with the teachings of the prior mentioned Beddows patent by wrapping both the connector and uninsulated extremities of the leads with a fusible fluorocarbon polymeric tape, e.g., a polyfluoroethylene-perfluoropropylene copolymer, whereafter a composite tape consisting of a fusible fluorocarbon polymer having an infusible fluorocarbon polymeric coating, e.g. a coating of polytetrafluoroethylene, is wrapped thereon with the fusible fluorocarbon polymeric tapes of the two tapered layers being in contact. The tapes then are induction-melted to form a liquid impervious insulation and the insulation is over taped with Mica-mat and glass tape whereafter vacuum pressure impregnation of the tapes with an epoxy resin and subsequent curing of the resin produces a mechanical armor for the connection.

Series connections of the coil end turns also can be achieved when the coil leads extend completely through the connector to protrude a slight distance, typically less than one-fourth inch, from the face of the connector remote from the coil. T.I.G. welding (i.e. welding with a non-consumable electrode in an inert atmosphere) then preferably is employed to join the strands and weld the joined strands to the connector sidewall. Welding with the coil lead ends protruding from the connector, however, does not produce a deep weld within the connection and therefore, this technique is not preferred for forming highly reliable welds.

It will be appreciated from the foregoing that reliable series connections of multiple strand aluminum coils can be made within a confined space by the use of aluminum prefabricated connectors. Moreover, because the connectors are designed with apertures situated approximately within the normal plane of the coil leads being connected, relatively little shaping of the coil leads is required.

FIG. 3 illustrates connector 16 of this invention, which connector is specially designed to join rectangular aluminum leads disposed in substantially orthogonal directions, e.g., for connecting the phase or the series leads to the circuit ring conductor of a conventional wye wound stator. The connector is characterized by slots 38 at opposite ends of the connector to receive circuit ring conductors 40 extending through the upper face of the connector partly into the connector body without requiring the application of axial force to the circuit ring conductors. Similarly, slots 42 disposed along the axial length of the connector extend through two orthogonal faces of the connector to suitably receive phase conductors 44 therein. Desirably, the slots extend to a depth producing a flush fit of the circuit ring and phase conductors at the slot surface with spans between one-fourth and three-fourths the connector depth normally being required for a mechanically secure joint. To assure superior contact between the conductors and the connector, the end faces of the conductors taper back from the confronting slot edge with proximity to the connector surface to produce a "J" weldment 46 during subsequent M.I.G. welding of the conductors to the connector. As previously described relative to welding the series connections, the individual rectangular strands forming the laminar phase and circuit ring conductors are initially welded. The joined conductors then are welded to the connector body and the voids between the sloped end of the conductors and the vertical interior edges of the slots are filled with aluminum weld to produce an overlying concave aluminum button.

While the connector of FIG. 3 is illustrated as having dual center slots extending through two orthogonal faces of the connector to receive the phase conductors therein, the connector also can be formed utilizing a single through slot, or aperture, (not shown) situated within the plane of the phase conductors and extending through opposite faces of the connector. The phase conductors then would be initially inserted into the center aperture whereafter the ring conductors could be dropped into slots cut into orthogonal faces at opposite ends of the connector.

It will be appreciated that the use of prefabricated aluminum connectors to join rectangular aluminum conductors of a dynamoelectric machine winding permits forming of small joints within a confined area without the use of corrosive flux or extensive shaping of the conductors being joined. The use of prefabricated connectors, moreover, also has been found to reduce the time required to form phase to ring connections of a wye wound stator by more than 50 percent relative to identical connections welded utilizing a reusable copper mold.

What is claimed as new and desired to be secured by Letters Patent of the United States is:

1. A dynamoelectric machine comprising:
   a. a multitude of coils each formed of a plurality of rectangular conductors wound in a pre-determined configuration,
   b. a plurality of stacked magnetic laminations having slots therein for receiving said coils with the end turns and leads of said coils protruding outwardly from at least one end of said magnetic laminations,
   c. electrical insulation covering each of said coils,
   d. series and phase connections selectively electrically joining said coil leads to provide a machine winding, at least one of said connections being characterized by an electrically conductive prefabricated connected situated at said one end of said stacked laminations, said prefabricated connector having a plurality of diverse slots therein receiving the uninsulated extremities of the coil leads being joined with each of said lead extremities within said connector being joined to said connector, at least one slot being disposed at each opposite end of said connector to receive ring conductors therein, said end slots extending through two orthogonally disposed surfaces of said connector, said connector further having at least one additional slot disposed intermediate said end slots to receive a rectangular conductor extending in a direction substantially orthogonal to the direction of said ring conductors, said connector lying substantially in the plane of each of said conductor, and,
   e. an insulating coating atop said connector and said uninsulated coil lead extremities.

2. A dynamoelectric machine according to claim 1 wherein said connector and conductors are aluminum, the upper surface of said lead extremities terminates short of the ends of their respective slots, and weld metal fills the remainder of said slots to form concave buttons thereover.

3. A dynamoelectric machine according to claim 2 wherein said connector is rectangular and each of said slots extend through two orthogonally disposed surfaces of said connector.

4. A dynamoelectric machine according to claim 2 wherein said connector has two slots disposed intermediate said end slots.

* * * * *